(12) United States Patent
Barker, Jr. et al.

(10) Patent No.: US 9,058,336 B1
(45) Date of Patent: Jun. 16, 2015

(54) MANAGING VIRTUAL DATACENTERS WITH TOOL THAT MAINTAINS COMMUNICATIONS WITH A VIRTUAL DATA CENTER THAT IS MOVED

(75) Inventors: David Wareing Barker, Jr., San Marcos, CA (US); Daniel J. Fregeau, Escondido, CA (US); Todd Michael Lauinger, Cardiff, CA (US)

(73) Assignee: EMC CORPORATION, Hopkinton, MA (US)

( * ) Notice: Subject to any disclaimer, the term of this patent is extended or adjusted under 35 U.S.C. 154(b) by 137 days.

(21) Appl. No.: 13/248,372

(22) Filed: Sep. 29, 2011

Related U.S. Application Data

(63) Continuation-in-part of application No. 13/174,213, filed on Jun. 30, 2011.

(51) Int. Cl.
| | |
|---|---|
| *G06F 15/177* | (2006.01) |
| *G06F 15/173* | (2006.01) |
| *G06F 11/30* | (2006.01) |
| *H04L 12/24* | (2006.01) |

(52) U.S. Cl.
CPC .......... *G06F 11/301* (2013.01); *H04L 41/0813* (2013.01)

(58) Field of Classification Search
CPC ..... H04L 43/04; H04L 43/06; H04L 43/0876; H04L 41/0813; H04L 41/08136; G06F 11/301; G06F 3/0662–3/0664; G06F 9/5061–9/5077
USPC .................................. 709/220, 221, 223, 224
See application file for complete search history.

(56) References Cited

U.S. PATENT DOCUMENTS

| | | | |
|---|---|---|---|
| 7,080,378 B1 | 7/2006 | Noland et al. | |
| 7,181,542 B2 | 2/2007 | Tuomenoksa et al. | |
| 7,373,660 B1 | 5/2008 | Guichard et al. | |
| 7,574,491 B2 | 8/2009 | Stein et al. | |
| 7,784,060 B2 | 8/2010 | Baumberger | |
| 7,793,101 B2* | 9/2010 | Wipfel et al. | 713/168 |
| 7,933,996 B2* | 4/2011 | Rechterman | 709/226 |
| 7,949,677 B2 | 5/2011 | Croft et al. | |
| 7,987,497 B1 | 7/2011 | Giles et al. | |
| 8,103,842 B2* | 1/2012 | Murase et al. | 711/162 |
| 8,275,868 B2* | 9/2012 | Rechterman | 709/223 |
| 8,280,431 B2* | 10/2012 | Sedayao et al. | 455/550.1 |
| 8,321,862 B2* | 11/2012 | Swamy et al. | 718/1 |
| 2002/0023210 A1 | 2/2002 | Tuomenoksa et al. | |
| 2005/0120160 A1* | 6/2005 | Plouffe et al. | 711/1 |
| 2006/0069761 A1* | 3/2006 | Singh et al. | 709/222 |
| 2008/0013481 A1 | 1/2008 | Simons et al. | |
| 2008/0037557 A1 | 2/2008 | Fujita et al. | |
| 2009/0055693 A1 | 2/2009 | Budko et al. | |
| 2009/0106405 A1 | 4/2009 | Mazarick et al. | |
| 2009/0217267 A1* | 8/2009 | Gebhart et al. | 718/100 |
| 2009/0259945 A1 | 10/2009 | De Spiegeleer | |
| 2010/0070870 A1 | 3/2010 | Halperin et al. | |
| 2010/0088150 A1 | 4/2010 | Mazhar et al. | |
| 2010/0106615 A1* | 4/2010 | Chadwick et al. | 705/26 |
| 2010/0125712 A1* | 5/2010 | Murase et al. | 711/162 |

(Continued)

*Primary Examiner* — Lance L Barry
(74) *Attorney, Agent, or Firm* — John Gould; Theodore A. Chen; Krishnendu Gupta

(57) ABSTRACT

This disclosure relates to a system for managing virtual datacenters. The disclosure describes a system in which virtual datacenters may be self contained logical units. These units may be managed from a central management tool. This management tool is able to manage the virtual datacenters from any location. If the virtual datacenters are moved, the tool maintains communications with them.

17 Claims, 6 Drawing Sheets

(56) References Cited

U.S. PATENT DOCUMENTS

| | | |
|---|---|---|
| 2010/0138830 A1 | 6/2010 | Astete et al. |
| 2010/0205286 A1* | 8/2010 | Rechterman .................. 709/223 |
| 2010/0205302 A1* | 8/2010 | Rechterman .................. 709/226 |
| 2010/0274890 A1* | 10/2010 | Patel et al. .................... 709/224 |
| 2011/0010711 A1* | 1/2011 | Patwardhan ....................... 718/1 |
| 2011/0019676 A1 | 1/2011 | Portolani et al. |
| 2011/0071983 A1* | 3/2011 | Murase ......................... 707/649 |
| 2011/0093849 A1 | 4/2011 | Chawla et al. |
| 2011/0307614 A1 | 12/2011 | Bernardi et al. |
| 2012/0016778 A1* | 1/2012 | Salle et al. ................... 705/27.1 |
| 2012/0054486 A1 | 3/2012 | Lakkavalli et al. |
| 2012/0054624 A1* | 3/2012 | Owens et al. ................. 715/735 |
| 2012/0089663 A1* | 4/2012 | Sedayao et al. ............... 709/202 |
| 2013/0013738 A1* | 1/2013 | Astete et al. .................. 709/217 |
| 2013/0136126 A1 | 5/2013 | Wang et al. |

* cited by examiner

MANAGING VIRTUAL DATACENTERS WITH TOOL THAT MAINTAINS COMMUNICATIONS WITH A VIRTUAL DATA CENTER THAT IS MOVED

CROSS REFERENCE TO OTHER APPLICATIONS

This application claims priority to co-pending U.S. patent application Ser. No. 13/174,213 for OPERATING VIRTUAL DATACENTERS, filed Jun. 30, 2011, which is incorporated herein by reference for all purposes. This application is related to U.S. Pat. No. 8,769,058, issued Jul. 1, 2014, for PROVISIONING INTERFACING VIRTUAL MACHINES SOFTWARE SOLUTIONS TO SEPARATE VIRTUAL DATACENTERS, which is incorporated herein by reference for all purposes.

FIELD

This invention relates generally to information management services, and more particularly to a system and method for managing virtual datacenters.

BACKGROUND

The cost, complexity, and time required to implement on-premise information management services often far exceeds their business value. Valuable resources may be consumed in tasks such as acquiring and racking hardware, installing software, configuring management and backup services, and testing the new environment. When adopting new information management services, it is necessary for users to ensure that the problem being solved is large enough to rationalize these expenses.

These challenges to the user may also be problematic for a supplier. Prospective customers may be hesitant to adopt new systems due to limited resources and exorbitant costs. This may decrease a supplier's income and directly impact their profits. Further, a supplier may be forced to continue offering services, such as technical support, for outdated systems. These services may divert valuable assets from more profitable ventures.

Technical support may present a further issue to the supplier because user environments may not be unique. Users may build these environments using a variety of different hardware and software options. Even when best practices documents are provided there is no way to ensure that users are complying with best practices. As a result, technical issues which never should have arisen may need to be addressed. Such situations may result in significant losses to both the user and the supplier.

Despite these obvious limitations to on-premise resource management solutions, off-premise solutions may not be practical for, or available to, all users. For example, a large corporation may be reluctant to use an off-premise solution because of security concerns. They may feel that a local environment can be better protected than a remote one. There may also be industry standards or regulatory requirements which demand the end user maintain certain levels of control.

There is a need, therefore, for an improved method or system for implementing, distributing, and managing information management systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
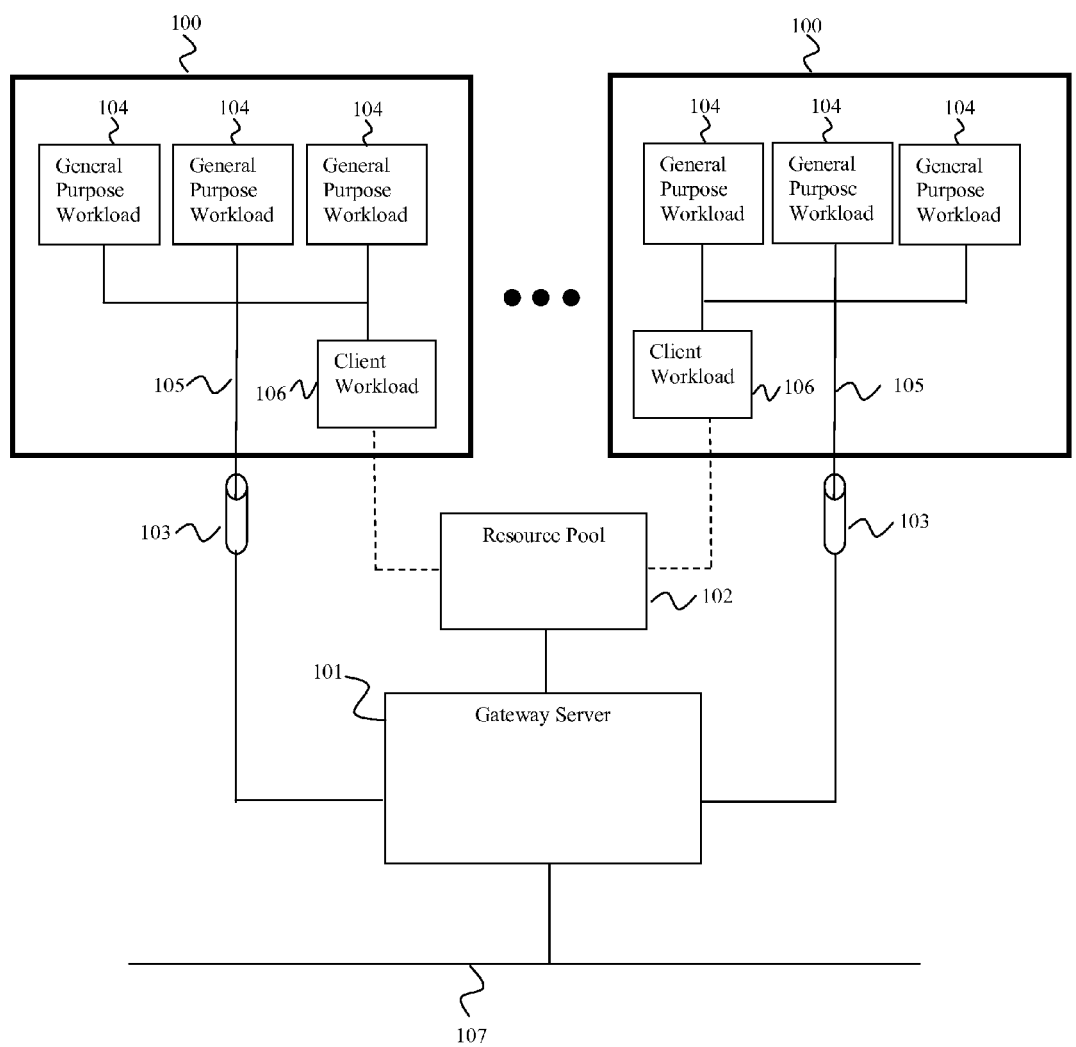
FIG. 1 is an overview of a virtual datacenter operations system.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to data storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

FIG. 1 is an overview of a virtual datacenter operations system. A plurality of general purpose workloads 104 and at least one client workload 106 may be created inside a virtual datacenter 100. Workloads 106 and 104 may communicate with each other across virtual network 105. Virtual network 105 could communicate with gateway server 101 via network tunnel 103. The gateway server 101 may be in communication with the external network 107 and resource pool 102. Resource pool 102 may be used to provision client environments 106 or other resources to users who access the gateway server 101.

In some embodiments, the virtual datacenters 100 may be VMware "organizations" created using VMware's vCloudDirector, a product provided by VMWare Corporation, which is hereby incorporated by reference, among others. In some embodiments, the virtual network 105 may be created using the vCloudDirector tool, a product provided by VMWare Corporation, which is hereby incorporated by reference, among others. Organizations may be logical units used to manage users or groups. An organization may also be used to manage physical resources. These physical resources may include storage, memory, or processing assets, among others. For example, one organization may be provisioned to use a single processor, 1 GB of memory, and 1 TB of storage.

Workloads 104 and 106 may comprise one or more virtual machines. Workloads 104 may be server environments running Unix, Linux, Solaris, OS X, Windows Server, or the like. Client workload 106 may be any client environment, such as Windows Remote Desktop Service. Further, client and server environments may exist within the same virtual datacenter 100. This allows complete enterprise solutions to operate within virtual datacenter 100. For example, a single virtual datacenter 100 may have an application server workload, a web server workload, and a plurality of remote desktop client workloads 106 to interact with the two server workloads. A single virtual datacenter 100 may also contain development, test, and production environments running as workloads 104 or 106.

Embodying a client and server environment within a single virtual datacenter 100 may also enhance a solution's portability. Placing both of these environments in a single logical unit may allow them to be moved together rather than independently. If the environments are not contained in this way, a user may be forced to transfer one and then the other; a process that may become more complicated based on the number of environments involved. Placing both environments in a single datacenter can allow the transfer to be a single step process.

In some embodiments the virtual datacenters 100 may interface with one another. This could be accomplished by communicating over a virtual or physical network. In such an embodiment a first virtual datacenter 100 may access a service or application operating on a second datacenter 100. For example, three individual datacenters 100 could be configured to act as development, testing, and production environments. These virtual datacenters 100 could then communicate with each other to transfer content appropriately across the environments.

Alternatively or additionally, virtual datacenters 100 may be isolated from one another. For example, a first datacenter 100 could be deployed on a system which contains one or more additional datacenters 100. This first datacenter 100 may be completely unaware of, and unconnected to, the other datacenters 100 running in the system. This may be particularly beneficial if the first datacenter 100 contains sensitive content. It could also be desirable if a system contains multiple datacenters 100 provisioned to different users. For example, two different entities may have virtual datacenters 100 operating in the same environment. Isolating the virtual datacenters 100 may therefore serve to enhance the integrity of the system.

Figure 2:
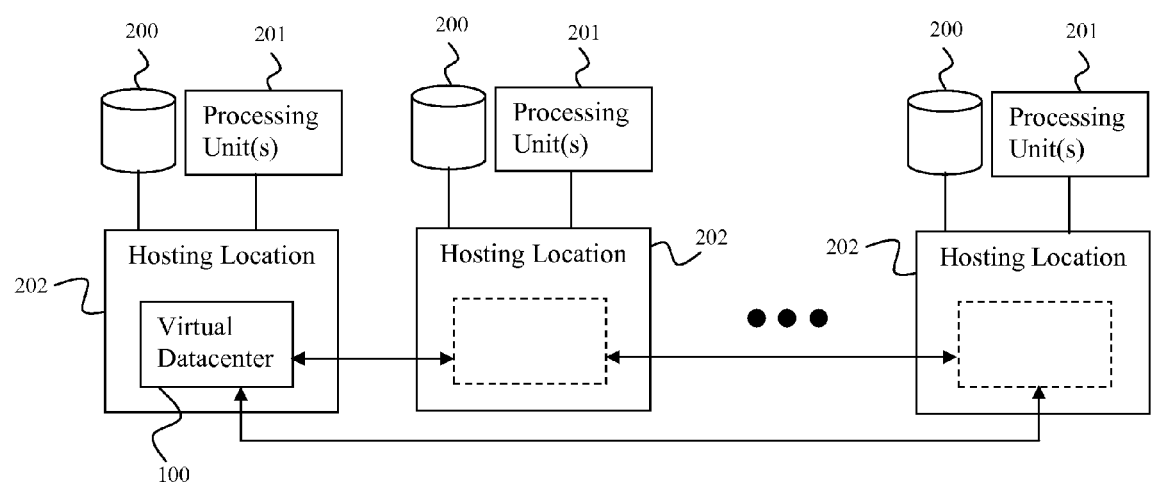
FIG. 2 is a diagram demonstrating the mobility of the datacenters.

FIG. 2 is a diagram demonstrating the mobility of the datacenters. Hosting locations 202 may be capable of hosting virtual datacenters 100. The hosting locations 202 may have access to storage 200 and processing units 201. The hosting locations 202 may also have access to other physical resources, such as memory.

Each hosting location 202 may be capable of hosting one or more virtual datacenters 100. The hosting locations 202 may be located at a variety of places, including on-premise or off-premise locations. Virtual datacenters 100 may be moved between hosting locations 202 as desired by the user, system administrator, or other authorized entity. In some embodiments, elements of a virtual datacenter 100 may exist on a variety of hosting locations 202. As a non-limiting example, a workload 104 or 106 which requires a large number of resources may be run at an off-premise location while the remaining workloads 104 or 106 are local. Transfer of the workloads may be accomplished through any means, including over a network or by using a physical storage device such as a flash drive.

This portability feature may be particularly beneficial to a user who is considering a hosted solution, but is not ready to commit. For example, a user who is interested in an off-premise hosting location 202, but is concerned about security, may choose to build a virtual datacenter 100 on local hardware. If at a later date the user chooses to adopt the off-premise solution, they can easily move their virtual datacenter 100 from the local hosting location 202 to the off premise one. Another reason a customer may wish to transfer their virtual datacenter 100 is if they suddenly need more compute or storage resources due to a business change. Rather than investing the time and money in purchasing and configuring new hardware, a user can simply push their virtual datacenter 100 to an off-premise hosting location 202 to instantly gain the needed resources. Conversely, the virtual datacenter 100 may also easily be moved from a remote location to a local one. The virtual datacenter 100 could also be transferred between on-premise machines or between off-premise machines as desired. As non-limiting examples, movement may be necessary if an accident occurs, if there are security concerns about a given location, or in the event of a natural disaster.

Virtual network 105 may communicate with gateway server 101 through network tunnel 103. Network tunnel 103 may be a VPN tunnel, SSH tunnel, or the like. Gateway server 101, in turn, may communicate with resource pool 102. Resource pool 102 can be associated with the client workloads 106 and may be used to provision resources to users accessing gateway server 101. These resources may commonly be client workloads 106, but are not limited to such. The resource pool 102 could also be used to provision other virtual resources, such as virtual machines, as well as physical resources, such as storage, memory, or compute resources.

In some embodiments, both gateway server 101 and resource pool 102 are managed using VMware's product VMware View. Gateway server 101 may be a View Security Server and the resource pool 102 may be a View Connection Server. Other gateway and resource provisioning tools may be used. The gateway and resource pool may operate on the same or separate hardware.

Figure 3:
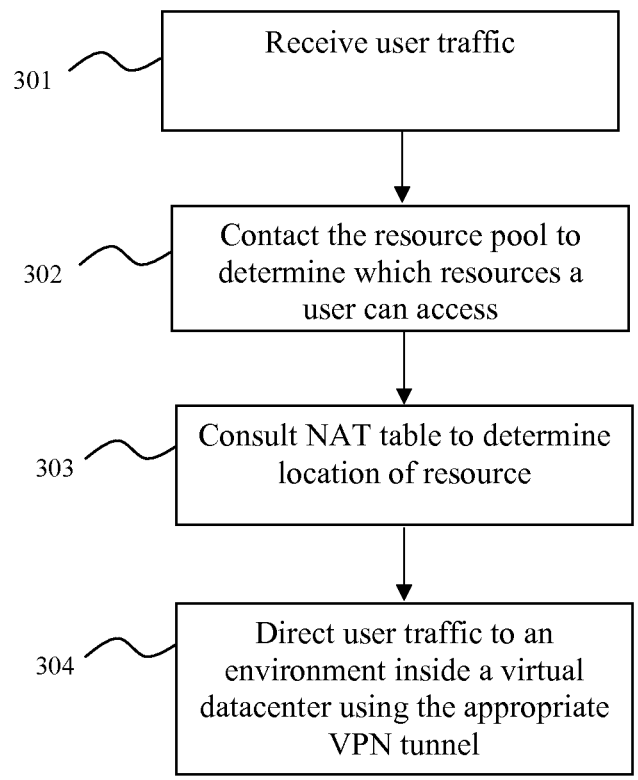
FIG. 3 is a flow chart illustrating the role of a gateway and resource pool.

FIG. 3 is a flow chart illustrating the role of the gateway server 101 and resource pool 102 in an embodiment. At 301 the gateway server 101 receives user traffic. At 302 the gateway server contacts the resource pool 102 to determine which resources the user is allowed to access. At 303 the gateway server 101 attempts to determine the location of the provisioned resource. Once a resource has been located, the user traffic is directed to it at 304.

When determining the location of a resource the gateway server 101 or resource pool 102 may use Network Address Translation (NAT) Tables or a similar technology. The NAT mapping can be used to direct users through a network tunnel 103, such as a VPN tunnel, linking the gateway server 101 to the provisioned resource. This resource may be a client workload 106 which exists inside a virtual datacenter 100.

The gateway server 101 and resource pool 102 may also aid in the portability and management of the virtual datacenters 100. In some embodiments, these elements exist independent of the virtual datacenters 100. A user can move their virtual datacenter 100 between hosting locations 202 and still access that environment through the same gateway server 101. This could be accomplished by updating a NAT table or other routing mechanism. Further, one gateway server 101 and resource pool 102 can be used to manage a plurality of virtual datacenters 100. For example, a supplier can create multiple virtual datacenters 100 on their hosting location 202. The supplier could then assign these virtual datacenters 100 to different users who can transfer them as desired. The supplier could still access these environments as necessary though the gateway server 101. Such access could be used to conduct maintenance on the virtual datacenters 100 or to ensure best practice policies are enforced.

In an embodiment, virtual datacenters are isolated from one another. In such an embodiment the individual datacenters may have no communication with the other datacenters and may be unaware of their existence. Alternatively or additionally, some virtual datacenters may interface with each other. This interface could occur, for example, through the use of a physical or virtual network. In such an embodiment one virtual datacenter could access services running on another virtual datacenter. These services could include security services, management services, or file transfer services.

In an embodiment, the gateway server 101 and resource pool 102 may be secured by a firewall. This firewall aids in preserving the integrity of the system and the underlying virtual datacenters. The firewall could be established, for example, through the use of VMware's vShield technology. vShield Edge could be used to secure the gateway server 101 or individual virtual datacenters 100. vShield could also be leveraged to protect individual workloads 104 and 106 within a datacenter. vShield App, or a similar technology, may be used to monitor network traffic on the virtual network 105 which connects the workloads 104 and 106 together and to the gateway server 101. Other technologies could also be used to protect individual workloads 104 and 106. These technologies could be used to firewall workloads 104 or 106, virtual machines inside those workloads, or virtual network 105.

Figure 4:
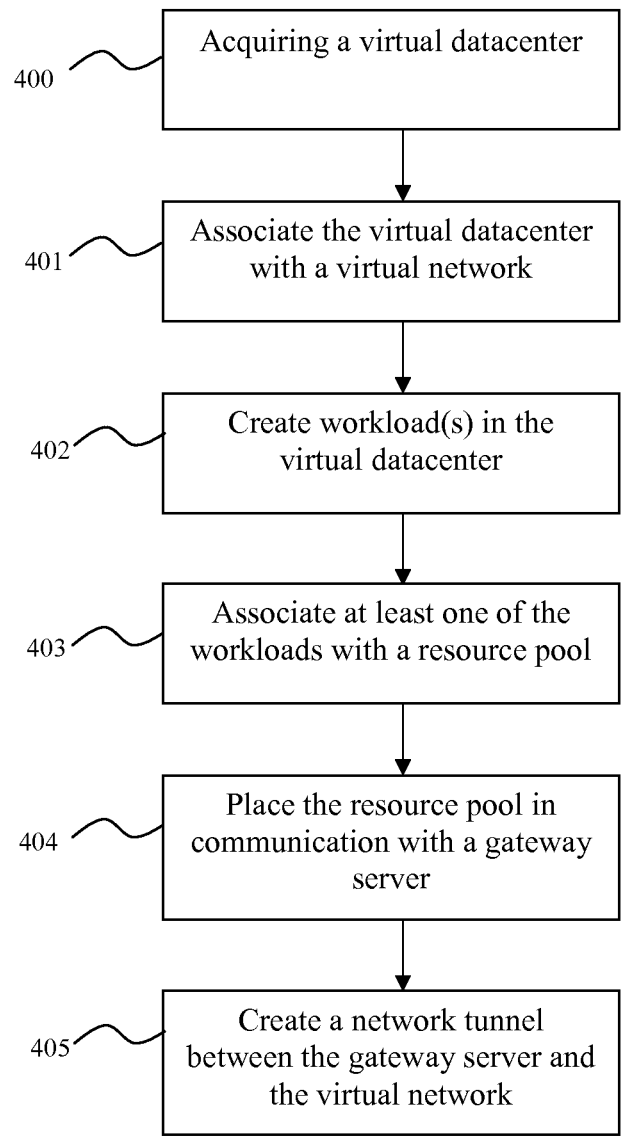
FIG. 4 is a flow chart illustrating the creation and operation of a virtual datacenter.

FIG. 4 is a flow chart illustrating the creation and operation of a virtual datacenter 100. At 400, a virtual datacenter 100 is acquired. In an embodiment, the virtual datacenter 100 may be acquired by building an "organization" using VMware's vCloudDirector tool. At 401 the virtual datacenter 100 can be associated to a virtual network 105. At 402, a plurality of workloads may be created within the datacenter. To facilitate portability, one of the workloads may be a client workload 106, such as a remote desktop server. Each of these workloads may be in communication with the virtual network 105. At 403 at least one of the workloads can be associated with a resource pool 102 which may later be used to provision environments to users. At 404 the resource pool 102 can be placed in communication with a gateway server 101, wherein the gateway server may be connected to an outside network 107. At 405 a network tunnel 103 could be created between the gateway server and the virtual network.

Figure 5:
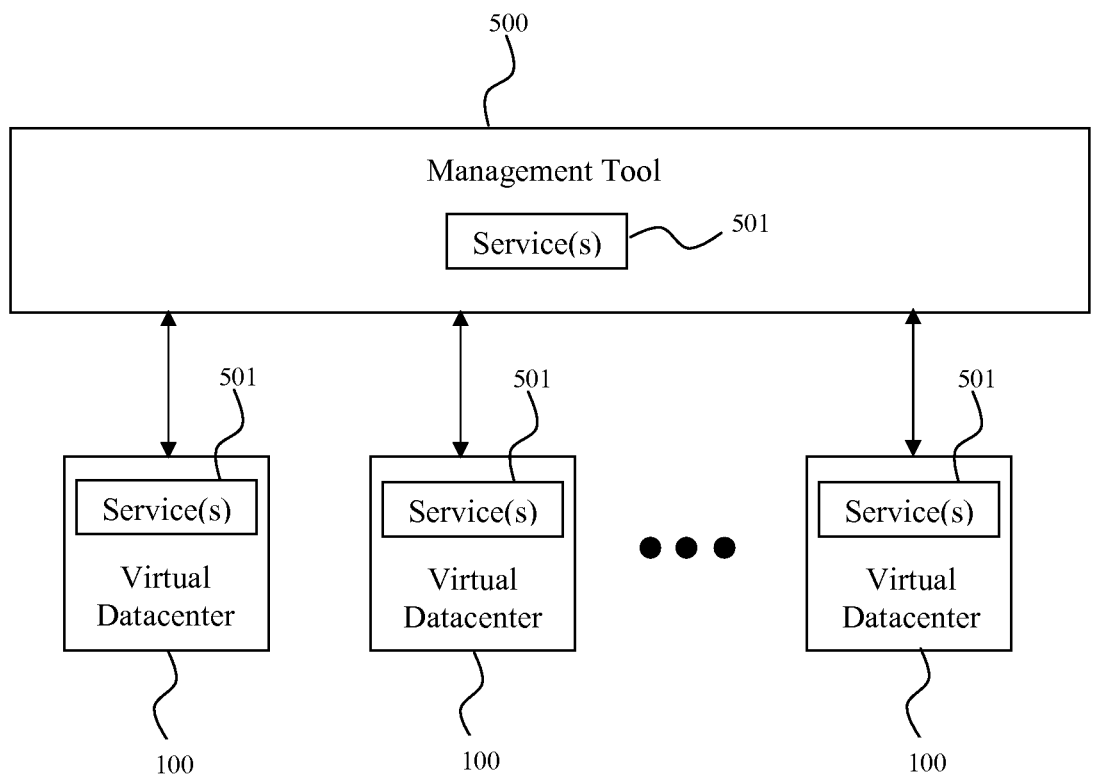
FIG. 5 is an overview of a virtual datacenter management system.

FIG. 5 is an overview of a virtual datacenter management tool. Management tool 500 is in communication with a plurality of virtual datacenters 100. The management tool 500 and virtual datacenters 100 may have one or more system services 501 running on them. These services may be accessed and managed using the management tool 501. Management system 500 may be run on a general or specific purpose computing device, and may be implemented in either hardware or computer readable code.

The management tool 500 may run on the same hardware environment as one or more virtual datacenters 100. Alternatively or additionally, it may run on discrete hardware from the virtual datacenters 100. The physical location of the hardware running the management tool 500 may be independent of the location of the virtual datacenters. The management tool 500 may maintain communication with the virtual datacenters 100 and their services 501 regardless of where the components are located. For example, if a virtual datacenter 100 is created on an off-premise hosting location 202 and is later moved by a user to an on-premise environment, the management system 500 could still access that datacenter. This allows users to freely move virtual datacenters 100 while managing them from a central location. This communication may be any form of digital or analog communication, such as a network connection.

The management tool 500 may provide a standard user interface for interacting with the services 501 and the virtual datacenters 100. Alternatively or additionally, a plurality of separate user interfaces may be provided. This interface could be displayed in a web browser or in a standalone application. The interface could be used to access virtual datacenters 100 or services 501 running inside them. The interface could differ based on the type of user accessing it. As a non-limiting example, a service provider may be presented with options relating to the creation and deployment of virtual datacenters 100. The service provider may not, however, be able to access the data inside the virtual datacenter 100 after deployment. A user, in contrast, may use the interface to access their virtual datacenter 100, but not to create and deploy new ones. Alternatively or additionally, a service provider could maintain complete or partial access to a deployed virtual datacenter 100 and all of its services 501. Similarly, a user may leverage the interface to create or deploy new virtual datacenters 100.

In an embodiment, services 501 running in virtual datacenters 100 may be comprised of service agents installed in one or more workloads 104 or 106. For example, a virtual datacenter 100 may have a workload 104 or 106 comprised of a single virtual machine running antivirus software as a service agent. This agent could be configured to protect one or more workloads 104 or 106 or the virtual datacenter 100 as a whole. This agent may be exposed to the management tool 500 over a physical network, virtual network 105, or network tunnel 103. A user of the management system 500 could therefore monitor the service agents of a plurality of virtual datacenters 100 by accessing the management tool 500. In addition to antivirus software, other applications could include, but are not limited to, anti-malware, application health, resource monitoring, firewalls, network monitoring, intrusion detection/prevention, data loss prevention, identity management, authentication, authorization, role-based access control, backup, email and other messaging services, batch job management, and file transfer.

The services 501 and management tool 500 may be leveraged to provide different functionality to the virtual datacenters 100. One example is patch deployment. As noted above, virtual datacenters 100 may have different software products installed on them. Periodic patches may be released for these software applications. Given the distributed nature of the virtual datacenters 100, however, it may be difficult to update these products. In an embodiment, these patches are deployed using the management tool 500 and the services 501 running on the virtual datacenters. This deployment could occur in several ways. For example, deployment could occur by directly transferring the patch from the management tool. The patches may also be deployed by issuing an instruction to the virtual datacenters 100 to download it from another source.

In an embodiment patch deployment uses a tiered risk approach. Different patches may be assigned different priority levels. If a patch has a high priority, it may be automatically distributed to the appropriate virtual datacenters 100. If a patch has a lower priority, it may only be distributed at a user's request. VMware's Configuration Manager may be used to manage this patching process.

The services 501 may also be used in conjunction with the management tool 500 to monitor physical and virtual resources. For example, the services 501 could monitor the health and utilization of hardware and the virtual infrastructure. This virtual infrastructure could include, but is not limited to, virtual datacenters 100, workloads 104 and 106, virtual machines, virtual networks 105, or network tunnels 103. Resources to be monitored may include, but are not limited to, processing, memory, network, and storage capacity. In an embodiment, customized plugins may be developed to monitor specific resources. These plugins may be distributed to one or more workloads 104 or 106 using the management tool 500. VMware's Hyperic or Operations Manager may be used to perform this monitoring or analysis.

In an embodiment, the monitoring may be used to determine when additional resources are required. Projections may be created to predict when an upgrade may be necessary. These projections may be based on a variety of factors, including, but not limited to, current usage trends or user entered expectations. VMware's Capacity Management tool may be used to make these projections. Alternatively or additionally, the monitoring may determine when resources are being underutilized. The service 501 may then either raise a user alert or automatically reallocate the resources to new tasks or locations.

The monitoring service may also be used to generate reports regarding resource use. These reports could be customized to specific users or environments, or may be standardized. The reports may be generated periodically or on demand. The reports could provide information about which virtual datacenters 100 are consuming which resources. Monetary values may be allocated to this resource consumption, or the reports could be used for administrative purposes. VMware's Charge Back product may be used for generating these reports.

The services 501 may also be used to monitor changes to the virtual infrastructure. These changes may be recorded in a database or other location for analysis. Change monitoring may be used to record issues and why specific configuration changes were made. It may also be used to detect abnormal activity which may indicate part of the system is compromised. Change monitoring may interact with a variety of other services, including patch deployment, resource monitoring, issue tracking, or security services.

The services 501 may also be used for user authentication. User authentication may occur upon access to the management tool 500 or to the virtual datacenters 100 themselves. Authentication mechanisms may be Active Directory or LDAP. They may also leverage a single sign on (SSO) technology. In an embodiment, a multi-factor authentication mechanism is used. For example, a user may be required to login using a username, password, and rotating pin. RSA's SecurID may be used to provide the multi-factored authentication.

In an embodiment, the management tool 500 and services 501 may be used for policy enforcement. A user may use the management tool 500 to create one or more policies to be enforced on the virtual components, applications, or operating systems. These policies may be templates detailing specific settings for adherence. The templates may be passed from the management tool 500 to different virtual datacenters 100. If a discrepancy is found between the policy and the settings in the system, a user alert may be raised. Alternatively or additionally, the discrepancy may be automatically corrected. For example, a policy could be created instructing all firewalls to prohibit traffic over a specific port. If a firewall is found to be violating that policy, the port may be automatically closed and the appropriate users may be notified.

In an embodiment, the policy services may be used to ensure that all products in a virtual datacenter 100 adhere to a supplier's best practices. Using the management tool 500 to distribute these policies allows enforcement to occur from a central location. An administrator does not need to access a plurality of environments individually to ensure policy compliance. Instead, they can define the policies once and distribute them to all the virtual datacenters 100 in the system. Given the virtual nature of the datacenters 100, the policies may also be used to enforce hardware best practices. For example, it may be recommended that a given product run on three processors. If a virtual datacenter 100 only has two available processors, a new one may be instantly added to comply with the best practices policy. In a physical environment, a relatively significant amount of time and expense would be required to comply with the policy. This time and expense may increase significantly based on the number of systems that need to be modified. VMware's Configuration Manager may be used to control this remediation process.

Figure 6:
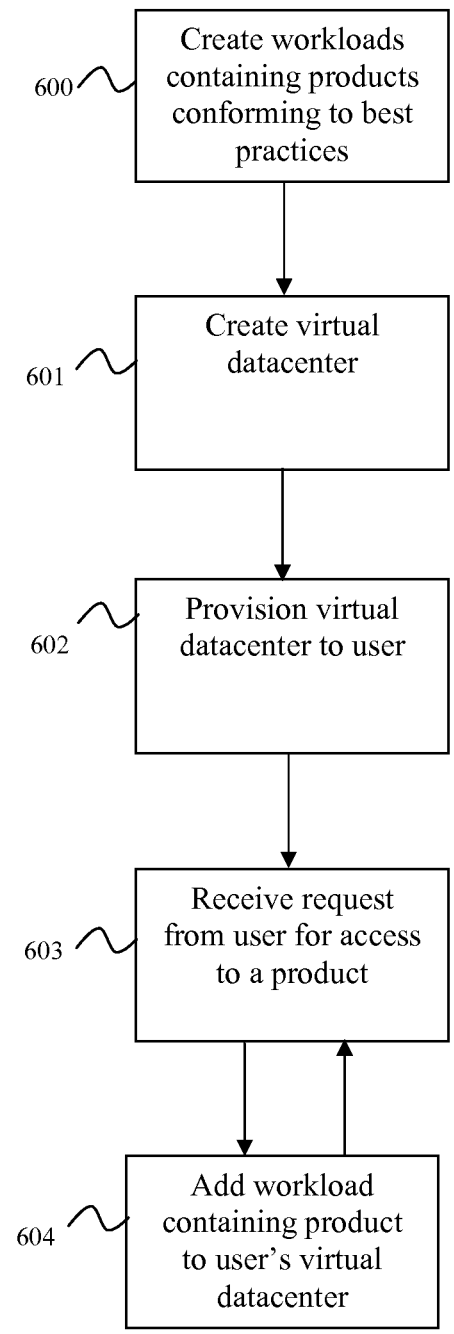
FIG. 6 is a flow chart illustrating granting users access to various products inside their virtual datacenter.

FIG. 6 is a flow chart illustrating provisioning software solutions to datacenters in a computer system. At 600 a plurality of workloads containing different software solutions may be created. These solutions may comply with a supplier's best practices. At 601 a virtual datacenter 100 can be created and at 602 this virtual datacenter 100 may be assigned to a user. At 603 a user can request access to a software product from an authorized entity. At 604 one of the workloads containing the desired product could be transferred to the user's virtual datacenter 100. New workloads may be created at any time, before or after creation or deployment of a virtual datacenter 100, or as new products are released. 603 and 604 may be repeated as often as necessary to grant a user access to products embodied in workloads.

Transferring preconfigured workloads to a user's virtual datacenter 100 has numerous advantages. It may significantly reduce time and monetary expenses because there is limited need for the user to purchase and configure new hardware. This method may also reduce the need for the user to install and configure the desired software in a new environment. Further, it could ensure that best practices are always followed because the workloads may be configured by the service provider.

Creation and distribution of preconfigured workloads may be facilitated using the management tool 500. This allows the entire provisioning process to occur from a central location. It also allows workloads to be transferred to any virtual datacenter 100 regardless of its location. Leveraging management tool 500 has the further advantage of allowing the service provider to monitor the health and status of the product contained in the workload as it runs in the user's virtual datacenter 100. This may enhance service areas such as customer support because the service provider could quickly access and troubleshoot malfunctioning products. The management system 500 can also be used to ensure that delivered products are always up-to-date. If the service provider can access a user's system, they can automatically install patches and updates as required. This again serves to ensure that product best practices are always followed.

In an embodiment, preconfigured workloads may be placed in a user's virtual datacenter 100 prior to their request. For example, a supplier could install a plurality of preconfigured workloads in a user's virtual datacenter 100 prior to provisioning the datacenter to the user. The workloads could be access restricted so that the user can only access ones they have requested. This may further reduce distribution time because there is no longer a need to transfer a workload at the user's request. All the supplier needs to do is grant the user permission to access that workload. As new products are released they could automatically or manually be transferred to the user's virtual datacenter 100. This embodiment may provide nearly instantaneous access to any product the supplier provides.

The workloads 104 and 106 and their software solutions may be preconfigured to interface with one another. For example, three separate workloads 104 and 106 may embody development, testing, and production environments. These environments may each have a software promotion application used to promote software packages from one environment to the next. This may allow a developer to create his code in the development workload, promote it to the test workload, and ultimately promote it to the production workload. The promotion software application on each of these workloads 104 and 106 may be pre-configured to interface with each other. A user could therefore start the development process with only the development workload. When it is time for testing, he may request the testing workload. When the testing workload is provisioned to his virtual datacenter, it may automatically connect to the development workload without further configuration. Similarly, the production workload may be provisioned and utilized without costly configuration tasks.

Workloads 104 and 106 may be distributed separately or in conjunction with each other. For example, a user who wishes to create a web application may request a web server workload and an application server workload. A user who wishes to only create a homepage, however, may request only the web server. If at a later date this user decides to develop a web application, he may request the application server as well. In an embodiment, the application server will automatically interface with the web server when the second workload is downloaded.

In an embodiment, workloads and software solutions may communicate across virtual datacenters 100. For example, one virtual datacenter 100 may be designed to hold only a database. This may be advantageous to a user who prefers segmented environments. A second virtual datacenter 100 may be designed to host a web application, such as a content management system. The web application may require access to the database running in the first virtual datacenter 100 to retrieve specific content. The workloads 104 and 106 of the virtual datacenters may communicate with one another to retrieve this content.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for managing virtual datacenters in a computer system, comprising:
configuring a datacenter management tool;
configuring a plurality of virtual datacenters;
establishing a communication between the management tool and at least one virtual datacenter of the plurality of virtual datacenters;
distributing workloads comprising a virtual machine across the communication to a virtual datacenter, wherein the virtual machine comprises a service agent in communication with the management tool;

transferring the virtual datacenter from a first environment to a second environment;

maintaining the communication between the management tool and the virtual datacenter after it is transferred to the second environment; and managing at least one service over the communication between the management tool and the virtual datacenter.

2. The method of claim 1, further comprising isolating a first virtual datacenter from a second virtual datacenter.

3. The method of claim 1, further comprising interfacing a first virtual datacenter with a second virtual datacenter.

4. The method of claim 3, further comprising accessing the first virtual datacenter from the second virtual datacenter.

5. The method of claim 1, further comprising operating the management tool with in a third environment.

6. The method of claim 5, wherein the first environment, the second environment, and the third environment are discrete from each other.

7. The method of claim 6, wherein the first environment, the second environment, and the third environment comprise separate hardware environments.

8. The method of claim 7, wherein the first environment is an on-premise hosting location and the second environment is an off-premise hosting location.

9. The method of claim 1, further comprising providing a user interface to the management tool.

10. The method of claim 1, further comprising deploying a patch across the communication to a virtual datacenter.

11. The method of claim 1, wherein the service monitors a physical resource in a virtual datacenter environment.

12. The method of claim 1, wherein the service monitors a virtual resource.

13. The method of claim 1, wherein the service monitors changes to a virtual datacenter.

14. The method of claim 1, wherein the service is a user authentication service.

15. The method of claim 1, wherein the service verifies virtual datacenter compliance with a defined policy.

16. The method of claim 15, wherein the defined policy is a best practices policy.

17. A non-transitory computer program product for managing virtual datacenters, comprising a computer usable medium having machine readable code embodied therein for:

configuring a datacenter management tool;

configuring a plurality of virtual datacenters;

establishing a communication between the management tool and at least one virtual datacenter of the plurality of virtual datacenters;

distributing workloads comprising a virtual machine across the communication to a virtual datacenter, wherein the virtual machine comprises a service agent in communication with the management tool;

transferring the virtual datacenter from a first environment to a second environment;

maintaining the communication between the management tool and the virtual datacenter after it is transferred to the second environment; and managing at least one service over the communication between the management tool and the virtual datacenter.

* * * * *